May 31, 1966 SHUICHI HORIUCHI 3,253,758

TAPE DRIVING DEVICE

Filed July 6, 1964

Inventor
Shuichi Horiuchi by Hill, Sherman, Meroni, Gross & Simpson Attnys.

United States Patent Office 3,253,758

Patented May 31, 1966

3,253,758

TAPE DRIVING DEVICE

Shuichi Horiuchi, Tokyo, Japan, assignor to Sony Corporation, Tokyo, Japan, a corporation of Japan Filed July 6, 1964, Ser. No. 380,570

Claims priority, application Japan, July 9, 1963, 38/52,043/63

3 Claims. (Cl. 226—181)

The present invention relates to a mechanism for driving elongated members at a constant tension and constant speed. The invention is particularly applicable to the driving of magnetic tape under conditions of constant tension and speed so as to improve the fidelity of reproduction achievable with magnetic record members of this type.

In order to produce high fidelity reproduction of magnetically recorded intelligence, it is essential that the record move past the transducer head at a constant speed. Otherwise, fluctuations in speed produce annoying sounds in the reproducing system which can be readily detected by the ear.

The most common type of magnetic recording drive system employs the combination of a capstan, driven by a motor and usually stabilized by the provision of a massive flywheel, in combination with a pressure or pinch roller consisting of a resiliently covered roller whose axis is parallel to the axis of the capstan, and whose resilient surface engages the surface of the capstan, with the magnetic tape confined therebetween. Normally, the rubber or other resilient surface is sufficiently resilient so that it wraps partly around the capstan. However, since the friction between the capstan and the pinch roller is greater than that existing between the capstan and the tape, and the friction between the tape and the pinch roller is greater than between the tape and the capstan, the movement of the tape is dictated substantially solely by the rotation of the pinch roller. In many cases, this results in slippage of the tape between the capstan and the pinch roller, resulting in a non-uniform speed being imparted to the motion of the tape.

With the foregoing in mind, an object of the present invention is to provide an improved tape driving system for driving a magnetic tape or the like at a uniform velocity.

Another object of the invention is to provide a tape driving mechanism including a capstan and pinch wheel assembly for uniformly driving a tape at a constant tension.

Another object of the invention is to provide a drive system for a tape recorder and the like which can be inexpensively fabricated.

Still another object of the invention is to provide a capstan and pinch roller assembly for magnetic tape drive systems which permits for some misalignment between the tape and the capstan without damaging the tape.

Other objects and features of the present invention will become apparent to those skilled in the art from the following description of the attached sheet of drawings in which.

As shown in the drawings.

Figure 1:
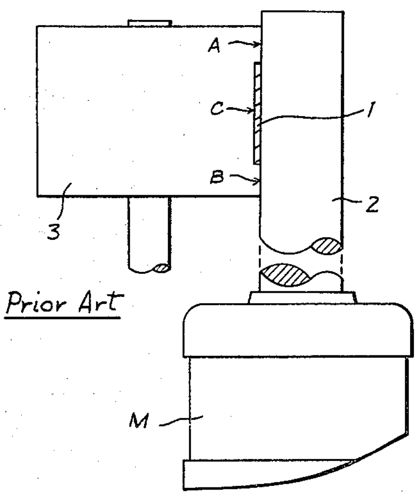
FIGURE 1 is a somewhat fragmentary view showing the arrangement of a capstan and pinch roller in the type of system practiced in the prior art.

In FIGURE 1, reference numeral 1 has been applied to a typical magnetic tape which may consist of a paper or synthetic resin backing coated with magnetizable particles of iron oxide or the like dispersed in a binder. In the prior art system, the tape 1 is pressed between a metal capstan 2 driven by a motor M and a resiliently covered pinch roller 3 pressing against the capstan 2. The pinch roller 3 is usually surfaced with a hard rubber material. The coefficient of friction between the capstan 2 and the pinch roller 3 is larger than the coefficient friction existing between the capstan 2 and the tape 1. The coefficient of friction between the tape 1 and the pinch roller 3 is larger than that existing between the tape 1 and the capstan 2. Accordingly, the tape 1 is driven along the area of the contacting face C at a rate dependent substantially only upon the rotation of the pinch roller 3. The pinch roller 3, itself, is driven by virtue of the pressure afforded between the surrounding areas A and B in contact with the surface of the capstan 2. In the illustrated instance, however, since the coefficient of friction between a capstan 2 and the pinch roller 3 is not always sufficiently large, slippage may occur between the two and the rotation of the pinch roller 3 becomes unstable as a result of such slippage. The overall effect is the inability of the tape to be driven at a constant speed.

In an attempt to overcome this difficulty, it has been suggested that the entire periphery of the capstan 1 be made rough in order to increase the coefficient of friction between the capstan 2 and the pinch roller 3 in order to avoid this slippage. In this circumstance, however, the friction is also increased between the capstan 2 and the tape 1 so that the tape is directly driven by the capstan 2 as well as the pinch roller 3. Since the circumferential speed on the contact surface of the tape 1 which is in contact with the pinch roller 3 differs from the speed of the surface which is in contact with the capstan 2, the tape is liable to be bent and uniform speed is not achieved.

In view of the foregoing, the tape driving device according to the present invention is one in which the rotational force of the capstan is transmitted directly and effectively to a pinch roller, and the tape is driven substantially only by the rotation of the pinch roller at a constant speed.

Figure 3:
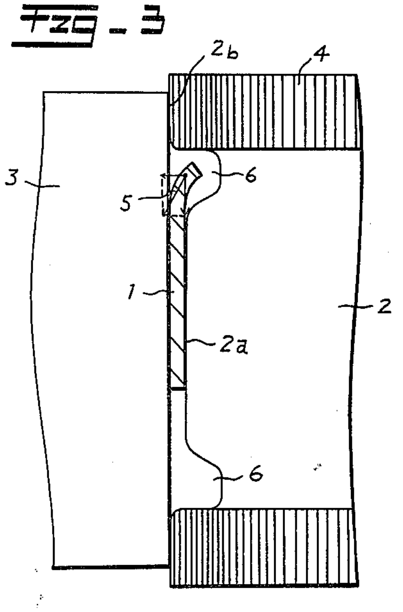
FIGURE 3 is a greatly enlarged view of the capstan and pinch roller assembly of the present invention indicating the manner in which misalignment between the driven tape and the capstan can be accommodated in the new drive system.
Figure 2:
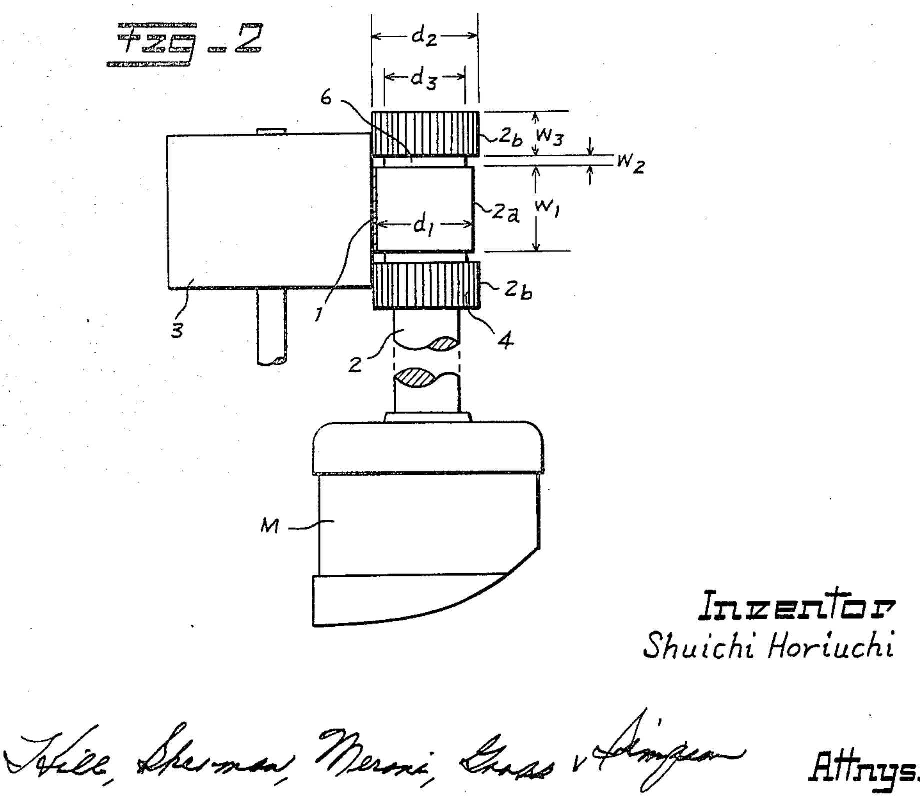
FIGURE 2 is a view in elevation of the improved capstan and pinch roller assembly according to the present invention.

The present invention, as illustrated in FIGURES 2 and 3, makes use of a capstan 2 driven by a motor M and including a centrally disposed tape engaging portion 2*a* against which the tape 1 is received. A typical resiliently surfaced pinch roller 3 having a generally smooth, continuous surface may be employed in conjunction with the capstan 2. The tape engaging section 2*a* has a width $W_1$ which is substantially equal to or a little larger than the width of the tape 1.

Disposed coaxially with the tape engaging central portion 2*a* are a pair of end portions 2*b* whose diameter $d_2$ exceeds the diameter $d_1$ of the tape engaging portion 2*a* by an amount substantially equal to twice the thickness of the tape 1. Accordingly, the tape 1 fits snugly in the space between the outer periphery of the tape engaging portion 2*a* and the outer periphery of the pinch roller 3.

The peripheral faces of the end portions 2*b* are roughened, as by providing axially extending notches 4 therealong. It should be mentioned that the end portions 2*b* can be made integral with the centrally disposed tape engaging portion 2*a*, or they can constitute separate pieces. Between the end portions 2*b* and the central portion 2*a*, there is a pair of annular grooves 6, the diameter of whose base, $d_3$ is less than the diameter $d_1$ of the tape engaging portion 2*a*. The grooves 6 accommodate a slight amount of movement of the tape 1 without having the tape engage the roughened surface provided by the notches 4, as best illustrated in FIGURE 3. If either end of the tape 1 should get into a groove 6 as shown in FIGURE 3, a vector force such as designated by the arrow 5 will be created. As a result, the tape tends to be forced back into proper alignment with the centrally disposed tape engaging portion 2*a*. The tape 1 is therefore never gripped by the notched sections 2*b* by virtue of the existence of the annular grooves so that the tape is not liable to damage by the roughened surface.

In accordance with the present invention, the portions 2*b* of the capstan have relatively large diameters and hence the pressure between the portions 2*b* and the pinch roller 3 can be made large. The frictional force between the capstan 2 and the pinch roller 3 is also large because of the roughened surface provided by the axially extending notches 4. Accordingly, the rotation of the capstan 2 is transmitted accurately and effectively to the pinch roller 3. The tape engaging portion 2*a* of the capstan 2 can be made with a highly polished or mirror-like surface. The frictional force between the tape 1 and the capstan 2 thereby becomes very small. Consequently, the tape 1 is driven substantially and effectively only by the pinch roller 3 and not directly by the capstan 2. The net result is that the tape is driven accurately at a constant speed, thereby attaining the stated objects of the invention.

For purposes of illustration, a capstan and pinch roller assembly was made up with the following parameters. The diameter of the tape engaging portion 2*a*, referred to as $d_1$ on the drawings was 8.50 millimeters. The diameter of the two end portions 2*b* referred to at reference $d_2$ in the drawings was 8.62 millimeters. The diameter of the base of the grooves 6, $d_3$, was 7.70 millimeters. The width of the tape engaging portion $W_1$, was 7.0 plus or minus 0.1 millimeters. The width of the grooves $W_2$, was 0.8 millimeter, and the width of the end portions 2*b*, identified at reference $W_3$ was 4.7 millimeters. The pitch of the notches 6 was 0.5 millimeter, and the capstan was made of a stainless steel. This assembly effectively provided a constant speed drive to the tape when employed with a constant speed motor.

It should be evident that various modifications and variations can be effected to the described embodiment without departing from the novel concepts of the present invention.

I claim as my invention:

1. In a tape driving mechanism, the combination of a capstan and a resiliently surfaced pinch roller having its axis parallel to the axis of said capstan, said capstan having a centrally disposed smooth tape supporting surface and roughened end portions axially spaced on both sides of said tape supporting surface, said end portions being separated from said tape supporting surface by a pair of grooves each of whose bases has a diameter less than the diameter of said tape supporting surface, the diameter of said roughened end portions exceeding the diameter of said tape supporting surface by about twice the thickness of the tape to be driven.

2. In a tape driving mechanism, the combination of a capstan and a resiliently surfaced pinch roller having its axis parallel to the axis of said capstan, said capstan having a centrally disposed smooth tape supporting surface and roughened end portions axially spaced on both sides of said tape supporting surface, said end portions being separated from said tape supporting surface by a pair of grooves each of whose bases has a diameter less than the diameter of said tape supporting surface, the diameter of said roughened end portions exceeding the diameter of said tape supporting surface by about twice the thickness of the tape to be driven, and said tape engaging portion having a width at least as great as the width of the tape to be driven.

3. In a tape driving mechanism, the combination of a capstan and a resiliently surfaced pinch roller having its axis parallel to the axis of said capstan, said capstan having a centrally disposed smooth tape supporting surface and axially notched end portions axially spaced on both sides of said tape supporting surface, said end portions being separated from said tape supporting surface by a pair of grooves each of whose bases has a diameter less than the diameter of said tape supporting surface, the diameter of said grooved end portions exceeding the diameter of said tape supporting surface by about twice the thickness of the tape to be driven, and said tape engaging portion having a width at least as great as the width of the tape to be driven.

References Cited by the Examiner

UNITED STATES PATENTS

| | | | |
|---|---|---|---|
| 2,990,092 | 6/1961 | Begun | 226—187 X |
| 3,142,429 | 7/1964 | Zivny | 226—187 |

M. HENSON WOOD, Jr., *Primary Examiner.*

ROBERT B. REEVES, *Examiner.*

R. A. SCHACHER, *Assistant Examiner.*